UNITED STATES PATENT OFFICE.

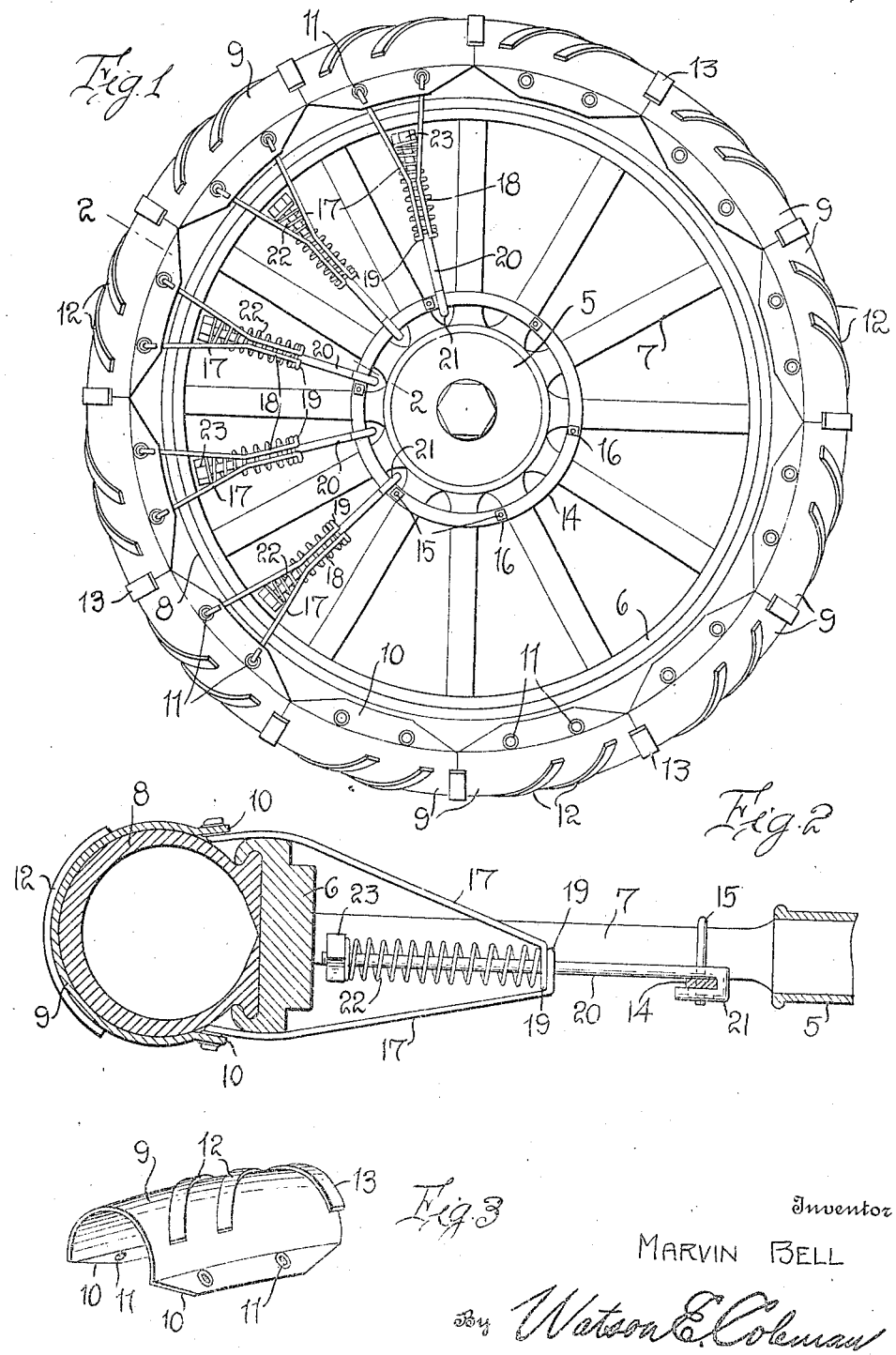

MARVIN BELL, OF ARDMORE, OKLAHOMA, ASSIGNOR OF ONE-THIRD TO LEE H. GRIFFIN AND ONE-THIRD TO WILLIAM F. WARREN, BOTH OF ARDMORE, OKLAHOMA.

DETACHABLE TREAD FOR WHEEL-TIRES.

1,247,207.  Specification of Letters Patent.  Patented Nov. 20, 1917.

Application filed August 23, 1916. Serial No. 116,509.

*To all whom it may concern:*

Be it known that I, MARVIN BELL, a citizen of the United States, residing at Ardmore, in the county of Carter and State of Oklahoma, have invented certain new and useful Improvements in Detachable Treads for Wheel-Tires, of which the following is a specification, reference being had to the accompanying drawings.

This invention relates to an improved detachable tread for wheel tires and has for its primary object to provide a sectional metallic tread and means for removably mounting the same upon a wheel, said means acting to hold the tread sections yieldably in close confinement upon the periphery of the tire and maintain such intimate engagement when the pneumatic tire is compressed.

It is an additional object of my invention to provide a device for the above purpose, consisting of a series of similar tread sections each provided with gripping or anti-skidding means, and means operatively connected to each of the tread sections and yieldably holding the same upon the tire for independent radial movement.

It is a further general object of the invention to simplify and improve the construction of devices of the above character and increase their efficiency and serviceability in practical use.

With the above and other objects in view, my invention consists in the novel features of construction, combination and arrangement of parts to be hereinafter more fully described, claimed and illustrated in the accompanying drawing, in which, Figure 1 is a side elevation of a wheel having my improved sectional tread applied thereto, some of the holding devices being removed;

Fig. 2 is an enlarged sectional view taken on the line 2—2 of Fig. 1; and

Fig. 3 is a detail perspective view of one of the tread plates or sections.

Referring in detail to the drawing, 5 designates the hub of an ordinary motor vehicle wheel, which is connected to the rim or felly 6 by means of a plurality of spaced spokes 7. 8 designates a pneumatic tire which is secured upon the wheel rim in any approved manner.

The accompanying drawing illustrates one embodiment of my invention which I have found to be quite desirable in practical use, wherein there is provided a plurality of tread plates or sections generally indicated by the numeral 9. Each of these plates is transversely and longitudinally curved as shown to fit snugly upon the tread and side portions of the tire casing when the same is inflated. The longitudinal edges of each plate 9 are obliquely inclined outwardly, as at 10, and provided with spaced, reinforced openings 11. Upon the outer convex surface of each tread plate, spaced, parallel, obliquely extending ribs or cleats 12 are integrally formed, and at one end of each plate a transversely disposed rib or cleat 13 is formed thereon and projects beyond the outer face of the plate and longitudinally beyond the end edge thereof. As clearly shown in Fig. 1 of the drawing, when the device is applied to the tire, these end ribs or cleats 13 are adapted to lap over contiguous ends of the adjacent tread plates 9 which are not provided with a rib 13. The ribs or cleats 12 and 13 insure a firm gripping engagement of the tread plates with the road surface and prevent lateral sliding or skidding movement of the wheel, as will be readily understood.

Upon one side of the series of wheel spokes 7 adjacent to the hub 5, a flat metal ring or annulus 14 is disposed and tightly held upon the spokes by means of a plurality of rods 15, each of which is formed with a terminal hook to embrace the wheel spokes. The other end of the rod is fitted through an opening in the ring 14 and is threaded to receive a clamping nut 16, whereby the ring is detachably clamped in place against shifting movement upon the wheel.

To the corresponding eyes or openings 11 in the longitudinal edges of each tread plate 9, the hooked terminals of a rod 17 are connected. The end portions of the rods 17 connected to each tread plate, converge inwardly toward each other and are then longitudinally extended in parallel relation, as at 18, and each of said rods is provided with a central, angularly disposed coil 19 which connects the opposed portions 18 of the rod. These rods 17 are preferably formed of heavy steel wire, and through the eyes 19 which are disposed in superposed relation, a rod 20 is loosely engaged, said rod extending radially of the wheel between adjacent spokes and having a hook 21 formed on its inner end which is engaged with the ring 14, as clearly shown in Fig. 2. A heavy coil spring 22 is arranged upon the outer end portion of the rod 20 between the coils 19 and a nut 23 which is threaded upon the outer end of the rod and may be locked thereon in any suitable manner. This nut provides means whereby the tension of the spring 22 under normal conditions may be suitably regulated.

From the above description, taken in connection with the accompanying drawing, the construction, manner of operation and several advantages of the invention will be readily understood. The tread plates or sections are successively applied upon the wheel tire, the tensioning wires 17 being engaged upon the rod 20 and said rod then hooked around the ring 14. The nuts 23 are properly adjusted so that the spring will exert sufficient pressure against the coils 19 of the wires 17 to hold the tread plates tightly upon the periphery of the tire casing and prevent their outward radial movement. When the wheel enters a rut in the road surface or encounters an obstruction so that the pneumatic tire will be compressed, the tread plates or sections 9 engaging the ground will also be positively forced inwardly and held in intimate contact with the tire by the expansion of the springs 22. The same action will, of course, take place as the several tread plates successively engage the ground and bear the weight of the vehicle body and the load. As above noted, the transverse and oblique cleats or ribs 12 and 13 effectively prevent skidding of the vehicle wheel and afford a firm, tractive engagement with the road surface. The several sections or plates constituting the tread may be very easily and quickly assembled and arranged upon the vehicle wheel or removed therefrom.

From the above, it will be seen that I have produced a very simple and effective device for the intended purpose and one which can be applied to the ordinary motor vehicle wheel without necessitating any alterations whatever therein. In view of the very simple construction of the several parts, it will also be appreciated that the device can be manufactured at relatively small cost.

While I have shown and described the preferred construction and arrangement of the several elements, it is to be understood that the same is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

The combination with a vehicle wheel having a resilient tire, of a detachable tread including a plurality of tread plates, radially disposed rods, means for detachably connecting the rods at one of their ends to the wheel adjacent the wheel hub, a pair of wire rods having their terminals spaced apart and connected to the edges of the respective tread plates on opposite sides of the wheel tire, the rods in each pair each being centrally formed with a laterally projecting coil, said coils being engaged with each other and upon one of the radial rods, and a spring on the rod acting against said coils to urge the pair of wire rods radially inward and maintain the tread plate in intimate contact with the wheel tire.

In testimony whereof I hereunto affix my signature in the presence of two witnesses.

MARVIN BELL.

Witnesses:
 Wm. F. Warren,
 L. H. Griffin.